(12) United States Patent
Gruber

(10) Patent No.: US 12,155,230 B2
(45) Date of Patent: Nov. 26, 2024

(54) WIRELESS POWER CONNECTOR

(71) Applicant: Renesas Design Austria GmbH, Graz (AT)

(72) Inventor: Bernhard Gruber, Graz (AT)

(73) Assignee: Renesas Design Austria GmbH, Graz (AT)

( * ) Notice: Subject to any disclaimer, the term of this patent is extended or adjusted under 35 U.S.C. 154(b) by 0 days.

(21) Appl. No.: 18/698,274

(22) PCT Filed: Jun. 14, 2022

(86) PCT No.: PCT/EP2022/066088
§ 371 (c)(1),
(2) Date: Apr. 3, 2024

(87) PCT Pub. No.: WO2023/061631
PCT Pub. Date: Apr. 20, 2023

(65) Prior Publication Data
US 2024/0333036 A1    Oct. 3, 2024

(30) Foreign Application Priority Data
Oct. 13, 2021 (EP) .................................. 21202375

(51) Int. Cl.
*H02J 50/12* (2016.01)
*H02J 50/80* (2016.01)
(52) U.S. Cl.
CPC ............. *H02J 50/12* (2016.02); *H02J 50/80* (2016.02)
(58) Field of Classification Search
CPC .................................. H02J 50/12; H02J 50/80
See application file for complete search history.

(56) References Cited

U.S. PATENT DOCUMENTS

| 2008/0133047 A1* | 6/2008 | Best | H01R 9/2475 340/568.1 |
| 2011/0221569 A1* | 9/2011 | Hamel | A61B 5/0031 340/9.1 |

(Continued)

FOREIGN PATENT DOCUMENTS

CN    102254201 A    11/2011

OTHER PUBLICATIONS

International Search Report and Written Opinion, mailed Oct. 7, 2022, from PCT/EP2022/066088, 11 pages.

(Continued)

*Primary Examiner* — Jared Fureman
*Assistant Examiner* — Michael J Warmflash
(74) *Attorney, Agent, or Firm* — Workman Nydegger

(57) ABSTRACT

A system of a transmitter device for the transmission of an analog signal and/or digital data provided to the system at a transmitter interface of the transmitter device is disclosed. The transmitter interface includes at least two parallel information lines. The system includes a receiver device with a receiver interface to receive the analog signal and/or digital data. The receiver interface includes the same number of parallel information lines. A transmitter protocol unit processes the analog signal and/or digital data to generate a serial data stream that includes reconstruction information. Transmission is performed via an electromagnetic field. The receiver device includes a receiver protocol unit to process and reconstruct the received serial data stream. The transmitter device is powered by electrical power provided at two power lines of the transmitter interface. The receiver device is adapted to provide power received from the transmitter device using a power recovery unit.

7 Claims, 4 Drawing Sheets

(56) References Cited

U.S. PATENT DOCUMENTS

| | | | |
|---|---|---|---|
| 2014/0191712 A1* | 7/2014 | Rea | H02J 50/20 |
| | | | 320/108 |
| 2014/0241555 A1* | 8/2014 | Terlizzi | H04B 1/385 |
| | | | 320/108 |
| 2020/0067567 A1* | 2/2020 | Coffey | G01S 5/04 |
| 2020/0373790 A1* | 11/2020 | Sampath | F16L 29/04 |

OTHER PUBLICATIONS

Oliveira et al., "All-Digital RFID Readers: An RFID Reader Implemented on an FPGA Chip and/or Embedded Processor", FEb. 1, 2021, vol. {0} 22, No. {0} 3, p. 18-24.

* cited by examiner

STATE OF THE ART

WIRELESS POWER CONNECTOR

FIELD OF THE INVENTION

The present invention relates to a system of a transmitter device, for the transmission of an analog signal and/or digital data provided to the system at a transmitter interface of the transmitter device, which transmitter interface comprises at least two parallel information lines, and a receiver device of the system with a receiver interface to provide the received analog signal and/or digital data by the system, which receiver interface comprises the same number of parallel information lines as the transmitter interface

BACKGROUND OF THE INVENTION

The invention is related to devices in the military area or aviation area or other technical areas where it is highly essential that the devices are very robust with a long lifetime and a high technical stability. If such a first device needs to be connected with such a second device, connectors and cables have to be used that follow the relevant standards for military or aviation. Such standards define e.g. robust plated electrical contacts and a solid housing which might have to be water-tight or other conditions need to be met. Furthermore, some of these connectors have up to several hundred pins in huge dimensions with several hundred parallel information lines. These high-end boundary conditions makes such connectors technical complicated and expensive.

FIG. 1 shows an example of a socket and a plug of such a connector. The socket is connected to or part of the first device and realizes a transmitter device with a transmitter interface to which more than 20 parallel information lines or cables of the device are connected. The plug realizes a receiver device with a receiver interface to which the same number of more than 20 parallel information lines or cables with the same configuration of the second device are connected. It was a long felt need to find a robust and mechanical simple solution to connect such devices.

Oliveira Arnaldo S R et al: "All-Digital RFID Readers: An RFID Reader Implemented on an FPGA Chip and/or Embedded Processor" ISSN 1527-3342 discloses a system of a transmitter and a receiver device that exchange data via an RFID wireless interface as serial data stream.

SUMMARY OF THE INVENTION

It is an object of the invention to provide a system of a transmitter device and a receiver device to connect two devices in a robust and easy way. This object is achieved in a system according to claim 1.

The invention is based on the finding to generate a serial data stream out of the information on the parallel information lines in the transmitter device and transmit it over an wireless interface to a close coupled receiver device that recovers the information for the parallel information lines from the received serial data stream. The receiver device provides the received information at a receiver interface that has the same number and configuration of parallel information lines. In this way analog signals and/or digital data may be transmitted over the wireless interface. In a practical realization the plug of the first device shown in FIG. 1 may be replace by with a transmitter device with its information lines soldered within the first device that needs to be connected to the second device. The receiver device replaces the socket shown in FIG. 1, with the information lines of the receiver device soldered within the second device. Either the transmitter device or the receiver device or both could have some short cable with the antenna of the RFID wireless interface at its end. This provides a simple and mechanical very robust connection of the first device to the second device that need to be connected with each other.

In a preferred embodiment the first device needs to power the passive second device which could be a sensor for instance. A voltage sensing unit of the transmitter device senses the voltage level at two power lines of the transmitter interface, which voltage level information is transmitted as part of the serial data stream to the receiver device. The receiver device comprises a recovery unit to harvest power from the electromagnetic field and a buck-boost converter is used to provide at power lines of the receiver interface the same voltage level as it was sensed at the transmitter interface.

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 1:
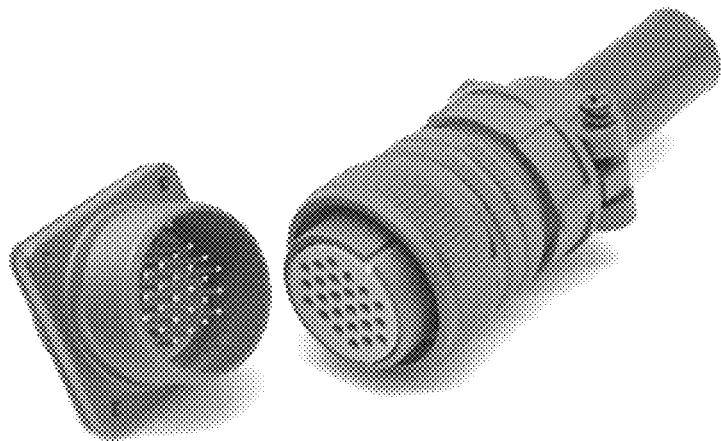
FIG. 1 shows an example of a socket and plug of a connector according to the state of the art.
Figure 2:
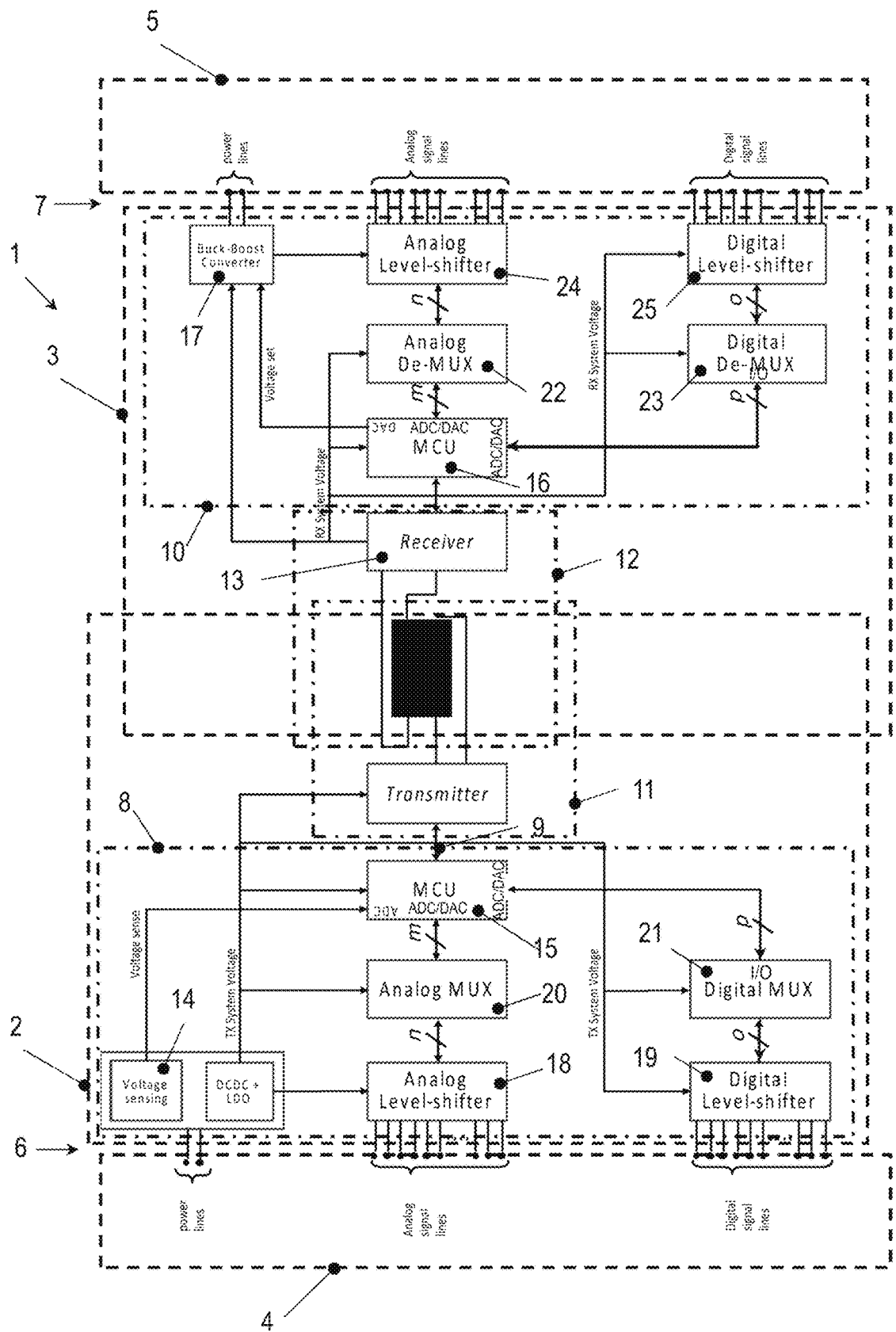
FIG. 2 shows a system of a transmitter device and a receiver device according to an embodiment of the invention.

FIG. 2 shows a first embodiment of a system 1 of a transmitter device 2 and a receiver device 3 which realize a connection to exchange information between a first device 4 and a second device 5. The first device 4 could be a computer of an airplane and the second device 5 could be a sensor array of 50 pressure sensors on one of the wing of the airplane to measure the pressure on different areas of the wing to detect turbulences. The connection between the computer and the sensor array has to be very robust with a long lifetime and a high technical stability. Information exchanged between the first device 4 and the second device 5 include analog signals on 50 parallel information lines or wires from the sensors and digital data on 10 parallel information lines or wires to a pre-processor of the sensor array. In a state of the art realizations a cable with these 60 parallel wires with two plugs needs to be connected with a socket of the first device 4 and a socket of the second device 5. These sockets and the cable are replaced by the system 1 with its transmitter device 2 and its receiver device 3.

The transmitter device 2 is soldered to the cables of above stated information lines of device 1 and replaces the socket of a state of the art realization. These cables with 60 parallel information lines provide the 50 analog signals and digital data in 10 parallel information lines of the first device 4 to a transmitter interface 6 of the transmitter device 2. The receiver device 3 of the system 1 comprises a receiver interface 7 to provide the received 50 analog signals and the received 10 digital data streams to the second device 5, which receiver interface 7 comprises the same number of parallel information lines as the transmitter interface 6. This ensures that state of the art systems may implement the inventive system 1, by unsoldering the sockets and soldering the transmitter device 2 to the cables of the first device 4 an by soldering the receiver device 3 to the cables of the second device 5.

The transmitter device 2 comprises a transmitter protocol unit 8 to process the analog signals and the digital data on the 60 information lines of the transmitter interface 6 to generate a serial data stream 9, that comprises all information needed to reconstruct the analog signal and the digital data in a receiver protocol unit 10 of the receiver device 3. The transmitter device 2 furthermore comprises an RFID wireless interface 11 with an antenna to transmit the serial data stream 9 via an electromagnetic field to a closed coupled antenna of a RFID wireless interface 12 of the receiver device 3. The electromagnetic field is generated by the transmitter of the RFID wireless interface 11 of the transmitter device 2 and received by the RFID wireless interface 12 of the receiver device 3 and has a frequency of 13.52 MHz. Communication on this RFID wireless interface complies to ISO18.093, the so called NFC Standard. Other frequencies in the RFID area like 125 kHz or 500 kHz or a frequency in the area of 865 to 896 MHz that comply to other standards could be used as well.

As the first device 4, the computer of the airplane, is powered by the airplane, and the second device 5, the sensor array, is a passive device, the second device 5 has to be powered by the first device 4. Transmitter device 2 therefore is powered with 24V DC by electrical power provided at two power lines of the transmitter interface 6 and the receiver device 3 needs to provide the power received from the transmitter device 2 at two power lines of the receiver interface 7 to power the second device 5. To enable that, the receiver device 3 comprises a power recovery unit 13 as part of the receiver in the RFID wireless interface 12 to recover the power needed to drive the power lines and information lines of the receiver interface 7 from the electromagnetic field. Such a power recovery unit 13 is known to a person skilled in the art like e.g. described in the Wireless Charging (WLC) Technical Specification Version 2.0 of the NFC Forum.

The transmitter device 2 furthermore comprises a voltage sensing unit 14 to sense the voltage level of 24 V DC at the power lines of the transmitter interface 6. A micro controller unit 15 of the transmitter device 2 is built to include a voltage level information about the sensed voltage level into the serial data stream 9 received at a micro controller unit 16 of the receiver device 3. The micro controller unit 15 communicates with the micro controller 16 based on a fixed protocol which identifies which data package comprises which information, what enables the micro controller unit 16 to receive the voltage level information and to provide it to a buck buster converter 17 of the receiver device 3 to generate the voltage level of 24V DC of the power lines at the receiver interface 7 with the same voltage level of 24 V DC as at the power lines of the transmitter interface 6. This provides the advantage, that the system 1 can be used universal for devices powered with different voltage levels and it is ensured that the passive device is powered with the correct voltage level what avoids damages at the second device 5.

The transmitter protocol unit 8 comprises analogue level shifter 18 for information lines that transmit an analog signal and a digital level shifter 19 for information lines that transmit digital data to shift the voltage level on the information lines of the transmitter interface 2 to a voltage level that may be processed by micro controller unit 15. Analog signals may for instance be provided by the first device 4 at transmitter interface 6 within a range of +/−12 V DC while the micro controller unit 15 may only process digital data in the range of +/−5 V DC. The same might be the case with digital data provided by the first device 4 at the transmitter interface 6. This provides the advantage, that the system 1 can be used universal for devices powered with different voltage levels and it is ensured that transmitter device 2 and receiver device 3 will not be damaged.

Transmitter protocol unit 8 furthermore comprises an analog multiplexer 20 connected to the analogue level shifter 18 for information lines that transmit an analog signal to provide the information from the analog signals to micro controller unit 15. Transmitter protocol unit 8 furthermore comprises a digital multiplexer 21 connected to the digital level shifter 19 for information lines that transmit digital data to provide the information from the digital data to micro controller unit 15. Micro controller unit 15 is built to compile the information received from the analog multiplexer 20 and the digital multiplexer 21 and the voltage sensing unit 14 into the serial data stream 9 based on the protocol with the micro controller unit 16.

Receiver protocol unit 10 furthermore comprises an analog demultiplexer 22 connected to the micro controller unit 16 of the receiver device 3 to demultiplex the serial data stream 9 received by the RFID wireless interface 12 of the receiver device 3 to provide the received analog signals on parallel lines. The receiver protocol unit 10 furthermore comprises a digital demultiplexer 23 connected to the micro controller unit 16 of the receiver device 3 to demultiplex the serial data stream 9 received by the RFID wireless interface 12 of the receiver device 3 to provide the digital data on parallel lines.

Receiver protocol unit 10 furthermore comprises an analog level shifter 24 connected to the analogue demultiplexer 22 to provide the analog signal at the parallel information lines of the receiver interface 7 with the same voltage level the analog signal was provided at the transmitter interface 6. The receiver protocol unit 10 furthermore comprises a digital level shifter 25 connected to the digital demultiplexer 23 to provide the digital data at the information lines of the receiver interface 7 with the same voltage level the digital data were provided at the transmitter interface 6.

This symmetrical realization of the transmitter protocol unit 8 and the receiver protocol unit 10 ensures that all analog signals and digital data of the transmitter interface 6 will be provided at the receiver interface 7.

Figure 3:
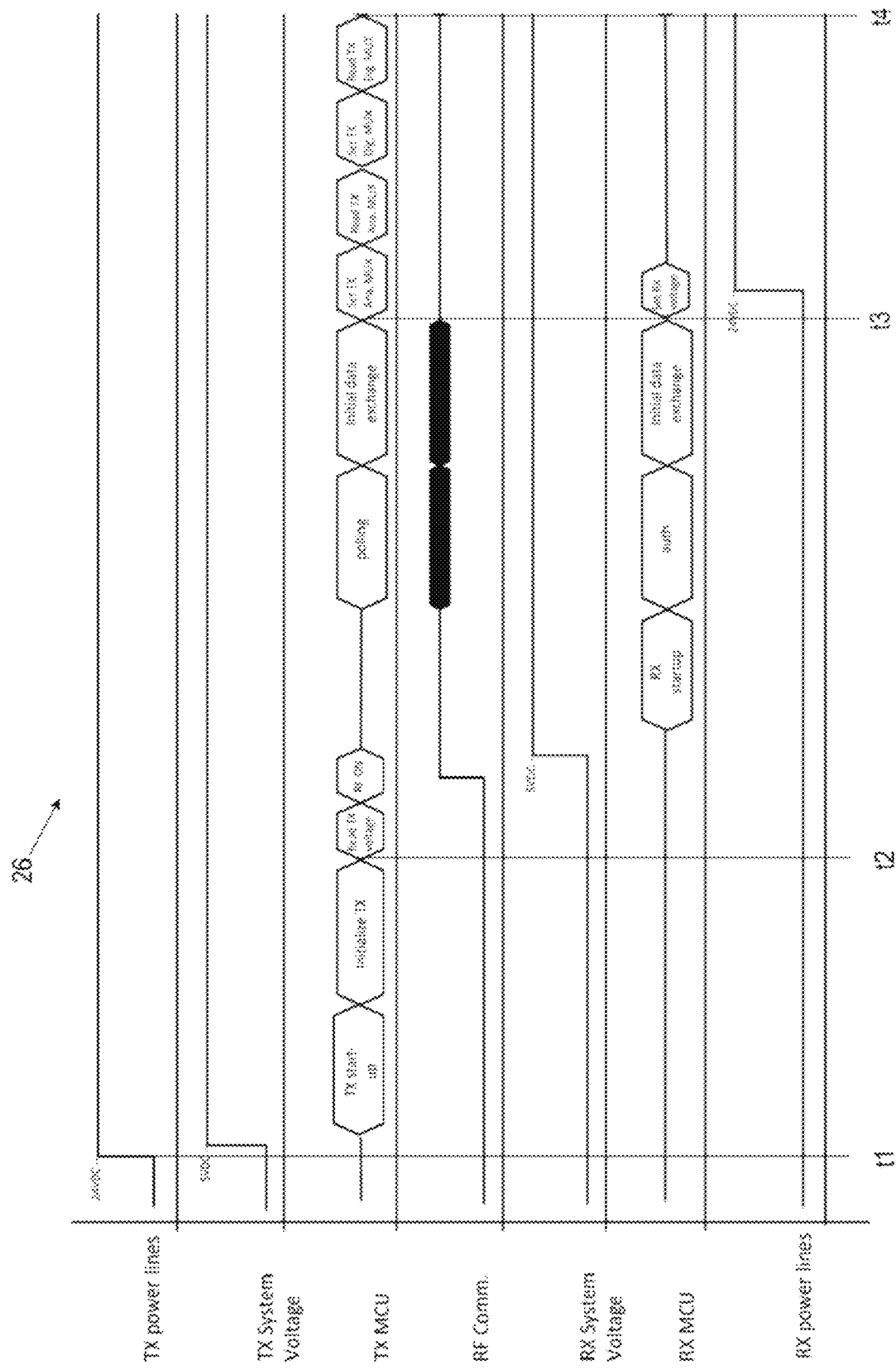
FIG. 3 shows a first part of a time diagram of signals and information on information lines of the system shown in FIG. 2.
Figure 4:
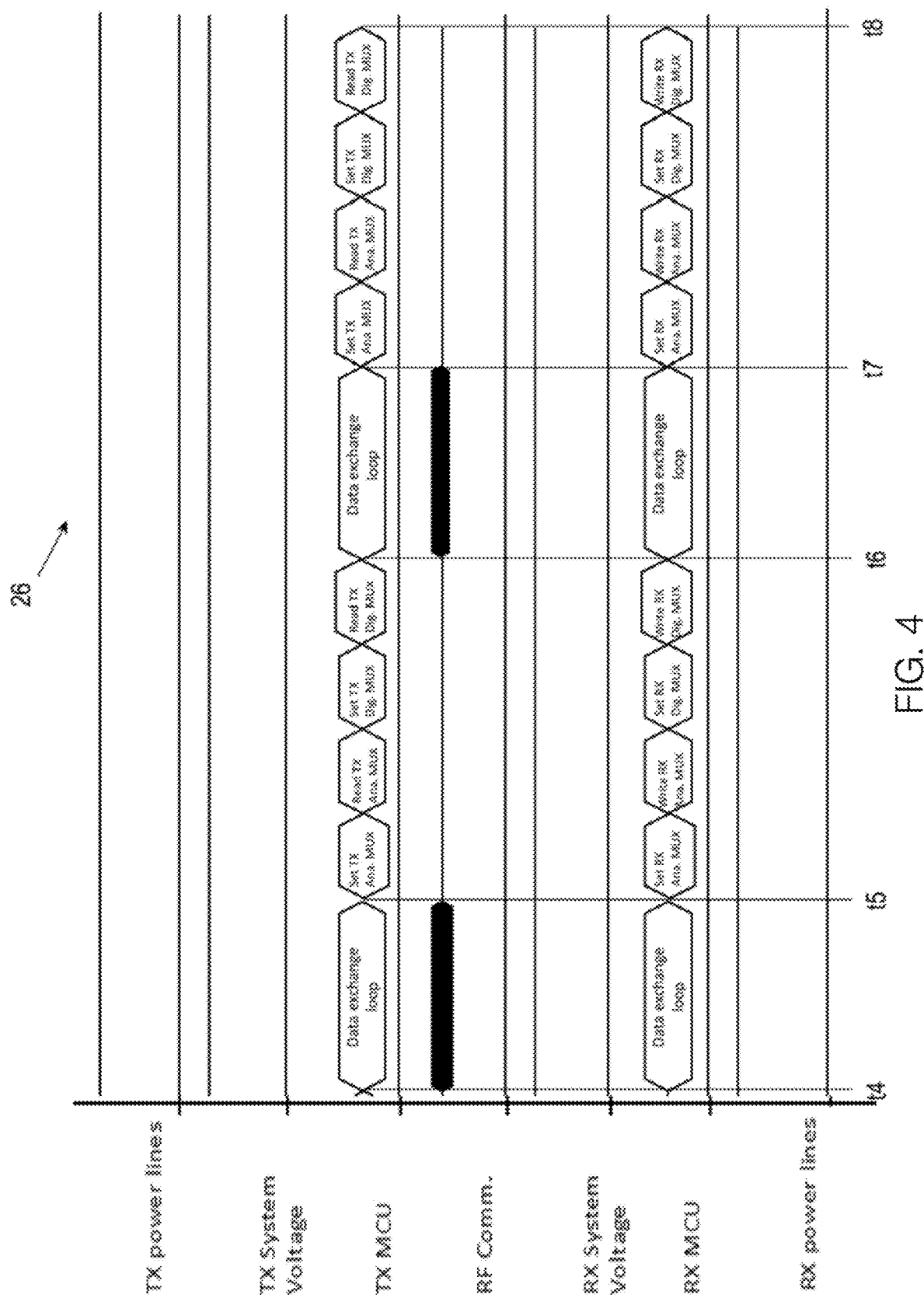
FIG. 4 shows a second part of the time diagram of signals and information on information lines of the system shown in FIG. 2.

FIG. 3 shows a first part of a time diagram 26 of signals and information on information lines of the system 1 shown in FIG. 2. At a time instance t1 power of the first device 4 is switched on and power lines (TX power lines) at the power lines of transmitter device 2 are powered with 24 V DC and system voltage (TX System Voltage) of 5 V DC is generated and supplied to all units of transmitter device 2. After a start-up routine (TX start-up) and initialization routine (Initialize TX) within transmitter device 2 voltage sensing unit 14 of transmitter device 2 starts to sense (Read TX voltage) the voltage level on the power lines of transmitter interface 6 at time instance t2. Afterwards the RFID wireless interface 11 of transmitter device 2 starts to transmit the electromagnetic field (RF ON) and power recovery unit 13 starts to generate the RX system voltage of 5 V DC to supply all units of the receiver. After that the RF communication with the RFID wireless interface 12 of the receiver device 3 starts based on the NFC standard protocol, which is driven by information and data exchange between micro controller unit 15 (TX MCU) and micro controller unit 16 (RX MCU). During an initial data exchange the voltage level information is received at receiver device 3 and at time instance t3 power lines (RX power lines) of receiver interface 7 are powered by buck boost converter 17.

During time instances t3 and t4 transmitter protocol unit 8 generates the serial data stream 9 that is transmitted by the RFID wireless interface 11 and received by the RFID wireless interface 12 during time instances t4 and t5. This process of the generation of the serial data stream 9 based on analog signals and digital data receive at transmitter data interface 6 and transmission of the serial data stream 9 to receiver protocol unit 10 to reconstruct these analog signals and digital data on receiver data interface 7 continues and repeats during the following time instances t6 and t7 and t8 and so on. This enables to provide the analog signals and digital data of the first device 4 to second device 5 with only a short delay caused by processing times of transmitter device 2 and receiver device 3.

The major advantages achieved with replacement of plugs and sockets and the cable of the start of the art is that no mechanical wear happens as the antenna of RFID wireless interfaces 11 and 12 have to be located only close-by. Furthermore the huge number of different types of plugs and sockets for all kind of different devices may be omitted what reduces spare parts to be held in stock. As the soldered electrical connection of the parallel information lines between the first device 4 and transmitter device 1 and the second device 5 and receiver device 3 is much more reliable than a plug connection, the use of system 1 increases the reliability. Furthermore the housing of the devices may be sealed against dust or water what makes the devices much more robust.

In a further embodiment of the invention transmitter device 2 may be integrated into the first device 4 and receiver device 3 may be integrated into the second device 5. The first device 4 and the second device 5 only have cable with antennas at their end which need to be put in close contact of a few centimeters to enable the transmission of analog signals and digital data as explained above. The length of the cables may be adapted depending of the application the devices are used for.

In a further embodiment of the invention data compression and decompression may be used to reduce the amount of data of the serial data stream transmitted.

The antennas used in the RFID wireless interfaces can be realized in many forms, most interesting will be the use of lumped elements (ordinary SMD inductors) as they can be reliable produced. Also, a combination of a spiral transmitter coil and a lumped receiver element coil that sits inside the second device (or the other way around) may be used.

The embodiment of the invention shown in FIG. 2 has been explained in a way that analog signals and/or digital data are only transmitted from the transmitter interface 6 to the receiver interface 7. In another embodiment of the invention analog signals and/or digital data may be transmitted in both ways what means that a transmission of analog signals and/or digital data on some or all information lines of receiver interface 7 may be transmitted via the receiver device and the transmitter device to the transmitter interface 6. This possible implementation is shown already in FIG. 2 with the double arrows on the signal lines for p and o and m and n between the micro controller units and the multiplexers and the level shifters in the transmitter device and the receiver device. In such an embodiment the micro controller units will need ADC and DAC converter at their input/output pins. This provides the advantage that a full replacement of the functionality of a cable with data transfer in both directions is provided.

The invention claimed is:

1. A system comprising:
 a transmitter device, for the transmission of an analog signal and/or digital data provided to the system at a transmitter interface of the transmitter device, which transmitter interface comprises at least two parallel information lines, and
 a receiver device of the system with a receiver interface adapted to provide the received analog signal and/or digital data by the system, which receiver interface comprises the same number of parallel information lines as the transmitter interface, wherein:
  the transmitter device comprises a transmitter protocol unit adapted to process the analog signal and/or digital data on the information lines of the transmitter interface and adapted to generate a serial data stream that comprises information to reconstruct the analog signal and/or digital data and,
  the transmitter device comprises an RFID wireless interface with an antenna adapted to transmit the serial data stream via an electromagnetic field to a closed coupled antenna of a RFID wireless interface of the receiver device close-by the antenna of the transmitter device and,
  the receiver device comprises a receiver protocol unit adapted to process the received serial data stream to reconstruct the analogue signal and/or digital data and adapted to provide it on the information lines of the receiver interface with the same configuration as provided at the information lines of the transmitter interface,
  wherein the transmitter device is powered by electrical power provided at two power lines of the transmitter interface and which receiver device is adapted to provide power received from the transmitter device at two power lines of the receiver interface and,
  the receiver device comprises a power recovery unit adapted to recover the power needed to drive the power lines and information lines of the receiver interface from the electromagnetic field.

2. The system according to claim 1, wherein the transmitter protocol unit comprises an analogue level shifter for information lines that transmit an analog signal and/or a digital level shifter for information lines that transmit digital data to shift the voltage level on the information lines of the transmitter interface to a voltage level that may be processed by a micro controller unit.

3. The system according to claim 2, wherein the transmitter protocol unit comprises an analog multiplexer connected to the analogue level shifter for information lines that transmit an analog signal and/or in which the transmitter protocol unit comprises a digital multiplexer connected to the digital level shifter for information lines that transmit digital data to provide the serial data stream to the micro controller unit.

4. The system according to claim 1, wherein the receiver protocol unit comprises an analog demultiplexer connected to a micro controller unit of the receiver device and adapted to demultiplex the serial data stream received by the RFID wireless interface of the receiver device and adapted to provide the analog signal and/or in which the receiver protocol unit comprises a digital demultiplexer connected to the micro controller unit of the receiver device adapted to demultiplex the serial data stream received by the RFID wireless interface of the receiver device to provide the digital data.

5. The system according to claim 4, wherein the receiver protocol unit comprises an analog level shifter connected to the analogue demultiplexer and adapted to provide the analog signal at the information lines of the receiver interface with the same voltage level the analog signal was provided at the transmitter interface and/or in which the receiver protocol unit comprises a digital level shifter connected to the digital demultiplexer adapted to provide the digital data at the information lines of the receiver interface with the same voltage level the digital data was provided at the transmitter interface.

6. The system according to claim 1, wherein the transmitter device comprises a voltage sensing unit adapted to sense the voltage level at the power lines of the transmitter interface and wherein the micro controller unit of the transmitter device is built to include a voltage level information about the sensed voltage level into the serial data stream received at the micro controller unit of the receiver device, which is built to provide the received voltage level information to a buck buster converter of the receiver device to generate the voltage level of the power lines at the receiver interface with the same voltage level as at the power lines of the transmitter interface.

7. The system according to claim 1, wherein the receiver device comprises a recovery unit that is built to harvest power from the electromagnetic field to power the receiver device.

* * * * *